Oct. 9, 1951     E. NOVITZKY     2,570,474
FISH LURE
Filed Oct. 16, 1945
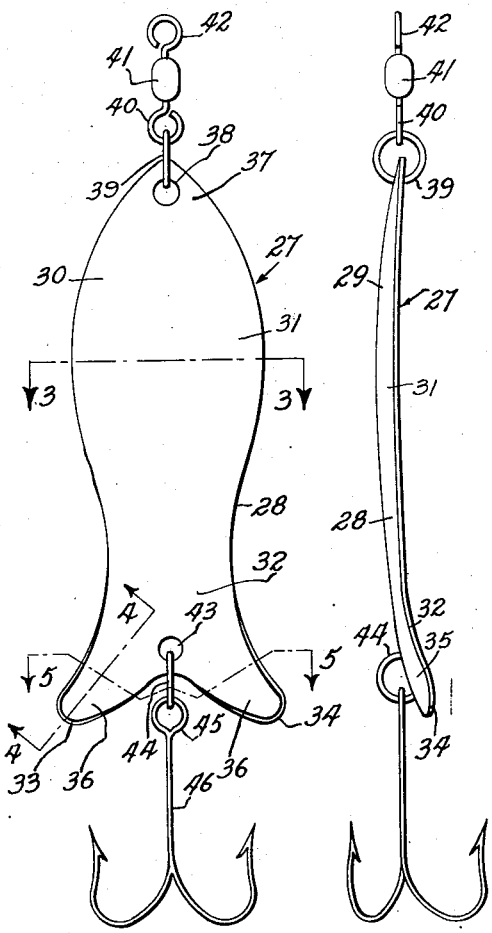
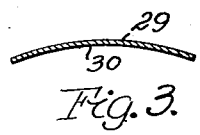
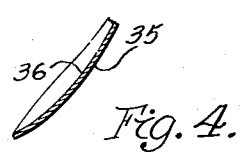
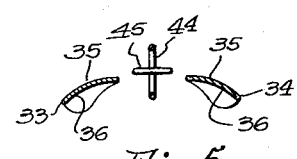
Inventor
Emil Novitzky
by Barthel & Bugbee
Att'ys Patented Oct. 9, 1951

2,570,474

UNITED STATES PATENT OFFICE 2,570,474

FISH LURE

Emil Novitzky, Detroit, Mich.

Application October 16, 1945, Serial No. 622,538

1 Claim. (Cl. 43—42.5)

This invention relates to fish lures, and, in particular, to wobbling fish lures.

One object of this invention is to provide a fish lure simulating a minnow and having a wobbling motion as it is drawn through the water.

Another object is to provide a fish lure having a wobbling motion produced by concavely formed tail portions on a concave plate-like body of minnow form.

Another object is to provide a minnow-like wobbling fish lure which rocks to and fro around a longitudinal axis without completely rotating as it is drawn through the water.

Other objects and advantages of the invention will become apparent during the course of the following description of the accompanying drawings, wherein:

Figure 1 is a front elevation of a fish lure having a wobbling action as it is drawn through the water, according to the invention;

Figure 2 is a side elevation of the fish lure shown in Figure 1;

Figure 3 is a cross-section along the line 3—3 in Fig. 1;

Figure 4 is a cross-section along the line 4—4 in Fig. 1;

Figure 5 is a cross-section along the zigzag line 5—5 in Figure 1.

Referring to the drawings in detail, Figures 1 and 2 show a fish lure, generally designated 27 and consisting of a thin minnow-shaped body 28 which is dished to provide a convex outer surface 29 and a concave inner surface 30. The body 28 has a body portion 31 and a tail portion 32 with portions 33 and 34 which are likewise dished or convexo-concave to provide outer convex surfaces 35 and inner concave surfaces 36. It will be observed that the tail portions 33 and 34 are angled in the same direction and extend outwardly beyond the limits of the body portion 31 at approximately the middle portion thereof so that the latter does not interfere with their action. Both the body portion 31 and the tail 32 with its portions 33 and 34 thus have radii of curvature both longitudinally and transversely. The body 28 is of shallow dished configuration with a depth of curvature which is relatively small in proportion to the width and radius of curvature of said body 28, as is self-evident from Figures 2 and 3 of the drawings. The body portion 31 and tail portions 33 and 34 merge smoothly into one another with a substantially continuous and uninterrupted curved surface extending thereover, as is apparent from Figure 2, the tail portions 33 and 34 being of dished formation and having a smaller radius of curvature than the transverse radius of curvature of the body portion 31, as is seen from a comparison of Figures 5 and 3. The head 37 of the body portion 31 is provided with an aperture 38 through which a ring 39 connects with the rear element 40 of the swivel 41, the forward element 42 being attached to a fishing line in the usual way. The tail 32 is likewise provided with an aperture 43 through which passes a ring 44 for connection to the eye 45 of a hook structure 46.

In operation, as the fish lure 39 is drawn through the water, it wobbles to and fro around the longitudinal axis of the body 31. The action of the water upon the convexo-concave or dished tail portions 33 and 34 which are angled in the same direction, produces this wobbling motion. This wobbling motion does not cause the fishing line to twist because the body 31 does not rotate, but in contrast, rocks back and forth transversely around a fore and aft line. This action is enhanced by the fact that the tail portions 33 and 34 are dished rather than flat.

While I have shown and described my invention in detail, it is to be understood that the same is to be limited only by the appended claim for many changes may be made without departing from the spirit and scope of my invention.

What I claim is:

A fish lure comprising an elongated pointed convexo-concave body of minnow-shaped outline with a pair of tail portions projecting outwardly and rearwardly from the rearward end thereof and angled in the same directions relatively to said body, a hook attached to the rearward end of said body between said tail portions, and a connection for attaching a line to the forward end of said body, said body being of shallow dished configuration with a depth of curvature which is relatively small in proportion to the width and radius of curvature of said body, said body and said tail portions merging smoothly into one another with a substantially continuous and uninterrupted curved surface extending thereover, said tail portions being of dished formation and having a smaller radius of curvature than the transverse radius of curvature of said body.

EMIL NOVITZKY.

REFERENCES CITED

The following references are of record in the file of this patent:

UNITED STATES PATENTS

| Number | Name | Date |
|---|---|---|
| 1,599,747 | Dills | Sept. 14, 1926 |
| 1,866,465 | Harrington et al. | July 5, 1932 |
| 1,991,142 | Eggleston | Feb. 12, 1935 |
| 2,053,954 | Marsh | Sept. 8, 1936 |